(12) United States Patent
Schmitt et al.

(10) Patent No.: US 12,245,615 B2
(45) Date of Patent: *Mar. 11, 2025

(54) METHOD OF PRODUCING A FOOD OR BEVERAGE PRODUCT WITH FREE DIVALENT CATIONS PROTEIN AGGREGATION

(71) Applicant: SOCIÉTÉ DES PRODUITS NESTLÉ S.A., Vevey (CH)

(72) Inventors: Christophe Joseph Etienne Schmitt, Servion (CH); Lionel Jean Rene Bovetto, Lucens (CH); Axel Syrbe, Clarens (CH); Michael Dennis Sharp, Bakersfield, CA (US); Madansinh Nathusinh Vaghela, Macedonia, OH (US); Rajiv Indravadan Dave, Bakersfield, CA (US); Markus Kreuss, Freimettigen (CH); Eric Stanislas Kolodziejczyk, Vevey (CH)

(73) Assignee: SOCIÉTÉ DES PRODUITS NESTLÉ S.A., Vevey (CH)

(*) Notice: Subject to any disclaimer, the term of this patent is extended or adjusted under 35 U.S.C. 154(b) by 452 days.

This patent is subject to a terminal disclaimer.

(21) Appl. No.: 17/582,291

(22) Filed: Jan. 24, 2022

(65) Prior Publication Data

US 2022/0142202 A1 May 12, 2022

Related U.S. Application Data

(63) Continuation of application No. 16/462,436, filed as application No. PCT/EP2017/083344 on Dec. 18, 2017, now Pat. No. 11,266,164.

(30) Foreign Application Priority Data

Dec. 19, 2016 (EP) .................................. 16205129

(51) Int. Cl.
*A23J 3/10* (2006.01)
*A23C 9/152* (2006.01)
(Continued)

(52) U.S. Cl.
CPC ............... *A23J 3/10* (2013.01); *A23C 9/1522* (2013.01); *A23G 9/325* (2013.01); *A23G 9/38* (2013.01)

(58) Field of Classification Search
CPC ..... A23C 9/1512; A23C 9/1522; A23C 9/154; A23C 21/06; A23L 29/231; A23L 29/281;
(Continued)

(56) References Cited

U.S. PATENT DOCUMENTS 11,089,791 B2 * 8/2021 Schmitt .................... A23C 1/14
11,266,164 B2 * 3/2022 Schmitt .................... A23G 1/56
(Continued)

FOREIGN PATENT DOCUMENTS

SU     1703025     1/1992
WO    2010092091   8/2010
(Continued)

OTHER PUBLICATIONS

Riou et al. "Behavior of Protein in the Presence of Calcium during Heating of Whey Protein Concentrate Solutions" Journal of Agricultural and Food Chemistry, 2011, vol. 59, pp. 13156-13164.
(Continued)

*Primary Examiner* — Brent T O'Hern
(74) *Attorney, Agent, or Firm* — K&L Gates LLP

(57) ABSTRACT

A food or beverage product with improved texture and mouthfeel. The food or beverage product includes aggregated proteins comprising micellar casein and whey protein aggregates. The product has a pH of 6.1-7.1, a concentration of 6-40 wt. % milk solids, a casein to whey protein ratio of 90/10-60/40, and a concentration of 3-8 mM free divalent (Continued)

cations. The agglomerates have a size of 5-50 microns mean diameter D(4,3) as measured by laser diffraction.

12 Claims, 13 Drawing Sheets

(51) Int. Cl.
*A23G 9/32* (2006.01)
*A23G 9/38* (2006.01)

(58) Field of Classification Search
CPC ...... A23L 29/238; A23L 29/25; A23L 29/272; A23L 2/66
USPC .......................................................... 426/583
See application file for complete search history.

(56) References Cited

U.S. PATENT DOCUMENTS

| 2011/0311703 | A1* | 12/2011 | Ummadi | A23G 9/38 |
| | | | | 426/656 |
| 2017/0367361 | A1 | 12/2017 | Kapchie et al. | |
| 2018/0220667 | A1 | 8/2018 | Sher et al. | |

FOREIGN PATENT DOCUMENTS

| WO | 2012016853 | 2/2012 |
| WO | 2012017043 | 2/2012 |
| WO | 2016102500 | 6/2016 |
| WO | 2016102501 | 6/2016 |
| WO | 2016102503 | 6/2016 |
| WO | 2016174651 | 11/2016 |
| WO | 2017021428 | 2/2017 |
| WO | 2017032817 | 3/2017 |

OTHER PUBLICATIONS

Ni et al. "Effect of temperature, calcium and protein concentration on aggregation of whey protein isolate: Formation of gel-like micro-particles" International Dairy Journal, 2015, vol. 51, pp. 8-15.

Russia Patent Office Communication for Application No. 20191.15755110(029987), dated Mar. 17, 2021, 13 pages.

* cited by examiner (A)

(B)

(C)

METHOD OF PRODUCING A FOOD OR BEVERAGE PRODUCT WITH FREE DIVALENT CATIONS PROTEIN AGGREGATION

CROSS REFERENCE TO RELATED APPLICATIONS

The present application is a continuation of U.S. patent application Ser. No. 16/462,436, filed on May 20, 2019, which is a National Stage of International Application No. PCT/EP2017/083344, filed on Dec. 18, 2017, which claims priority to European Patent Application No. 16205129.6, filed on Dec. 19, 2016, the entire contents of which are being incorporated herein by reference.

FIELD OF THE INVENTION

The present invention relates to a method of producing a food or beverage product, in particular to a method for forming agglomerated proteins in an ingredient composition.

The invention also relates to food or beverage product comprising aggregated proteins comprising micellar casein and whey protein aggregates.

BACKGROUND

It is known to provide texture and mouthfeel to food and beverage product by protein aggregation and there continue to be a need for food and beverage products exhibiting nutritional balance of macronutrients while delivering great taste and texture.

CN104489097A describes a process to obtain a heat convection drying protectant preparations for lactic bacteria or probiotics consisting in heat treating at 60° C. a milk preparation enriched with calcium in order to induce protein aggregation and subsequently submitting the preparation to a mechanical homogenization treatment.

WO07040113A describes the production of an ingredient exhibiting high content in milk-derived complex lipids. It is obtained by precipitating the protein fractions of butter serum at pH 4.0-5.0 in presence of calcium and filtering the supernatant in order to concentrate the complex lipids.

WO 06065135 A2 disclosing the production of a free divalent cations-rich liquid food product in which 20% of the lysine residues carried out by the proteins have been glycosylated in order to increase their resistance to aggregation in presence of calcium. Therefore, WO 06065135 A2 is related to preventing protein aggregation in presence of divalent cations, calcium among others.

US20130011515 A1 is describing a process for the production of a milk protein concentrate which is enriched with whey proteins. Skimmed milk is heated in the pH range 6.5-7.0 in order to promote aggregation of whey proteins together with caseins. The heated product is subsequently submitted to filtration in order to concentrate protein aggregates and to remove lactose.

D. L. Van Hekken et al. [Rheology and Microstructure of Chemically Superphosphorylated Whole Casein, 1997, J. Dairy Sci. 80 2740-2750.] describe the effect of addition of free calcium on the viscosity of superphosphorylated caseins. It was shown that the viscosity of a 4 wt. % superphosporylated caseins (190% phosphorylation) increased by addition of 30 mM calcium at pH 8.4.

C. Holt described in his paper [An equilibrium thermodynamic model of the sequestration of calcium phosphate by casein micelles and its application to the calculation of the partition of salts in milk, 2004, Eur. J. Phys., 33, 421-434] reported that the amount of free calcium ions in bovine milk at pH 6.70 was 10.2 mM and that this value decreased to 8 mM when milk pH decreased to 6.0.

I. R. McKinnon et al. [Diffusing-wave spectroscopy investigation of heated reconstituted skim milks containing calcium chloride, 2009, Food Hydrocolloids, 1127-1133] investigated the effect of calcium chloride addition to skimmed milk reconstituted at 10 wt. % in the pH range 6.0-7.2 and the subsequent effect on viscosity when the milks were heated for 10 minutes at 60, 75 and 90° C. They reported a critical instability pH of 5.9 for the milks upon heating at 90° C. for calcium chloride content up to 10 mM.

L. Ramasubramanian et al. [The rheological properties of calcium-induced milk gels, 2014, J. Food Engineering, 45-51] determined the impact of calcium chloride addition into full fat milk (3.5% fat) upon heating at 70° C. It was reported that calcium chloride addition below 12.5 mM was leading to viscous dispersions while higher calcium chloride concentrations induced formation of stronger gels. Interestingly, pre-treatment of the milk at 90° C. for 10 minutes before calcium chloride addition and subsequent heating at 70° C. was leading to the strongest gels. Gel formation is not desirable in many semi-solid food and beverage products.

T. Phan-Xuan et al. [Tuning the structure of protein particles and gels with calcium or sodium ions. 2013, Biomacromolecules, 14, 6, 1980-1989.] reported when treating 100% whey protein (beta-lactoglobulin) with an addition of calcium chloride at pH 7.0 it was leading to microgels or gel formation upon heating at 68 or 85° C. when calcium content was 5-6 mM for a protein concentration of 4 wt. %. Again gel formation is not desirable in many semi-solid food and beverage products.

The prior art teaching shows that although viscosity may be obtained with calcium addition gelling of is a well known effect which may be undesirable in food production. Furthermore, the pH of the product may vary and influence process and may lead to instability of the product. The prior art does not show how to provide food and beverage products delivering desirable taste and texture.

Thus, there is a need for food and beverage products exhibiting nutritional balance of macronutrients while delivering great taste and texture.

OBJECT OF THE INVENTION

It is thus the object of present invention to provide a food or dairy product with improved texture and mouthfeel.

SUMMARY OF THE INVENTION

The present invention provides the improvement by the use of milk protein-based aggregates by specific heat treatment in the presence of a specific concentration of added divalent cations.

In a first aspect, the invention relates to a method of producing a food or beverage product, comprising the steps of:
   providing an ingredient composition comprising micellar caseins and whey proteins and having a pH of 6.1-7.1 and a concentration of 1-15 wt. % of proteins, and wherein the ingredient composition has a casein to whey protein ratio of 90/10-60/40,
   adding 3-25 mM divalent cations to provide a concentration of 3-8 mM free divalent cations in the ingredient composition, homogenising the ingredient composition; and subsequently pasteurising and stirring the ingredient composition at a temperature of 80°-100° C. for a period of 0.5-3 min to form agglomerated proteins comprising caseins and beta-lactoglobulin from the whey proteins, the agglomerates having a size of 5-50 microns as measured by $D_{(4,3)}$ mean diameter.

The present invention uses milk protein-based aggregates that are generated upon heat treatment in presence of added-free divalent cations in order deliver optimum sensorial properties while allowing a reduction of the total fat content in the product. In addition, the described invention enables formulation of dairy-based texturized products without the use of additional stabilizers or hydrocolloids.

In a second aspect the invention relates to a food or beverage product comprising aggregated proteins comprising micellar casein and whey protein aggregates, wherein the product has a pH of 6.1-7.1, a concentration of 6-40 wt. % milk solids, a casein to whey protein ratio of 90/10-60/40, and a concentration of 3-8 mM free divalent cations, and wherein the agglomerates having a size of 5-50 microns mean diameter $D_{(4,3)}$ as measured by laser diffraction.

DETAILED DESCRIPTION OF THE INVENTION

Figure 1:
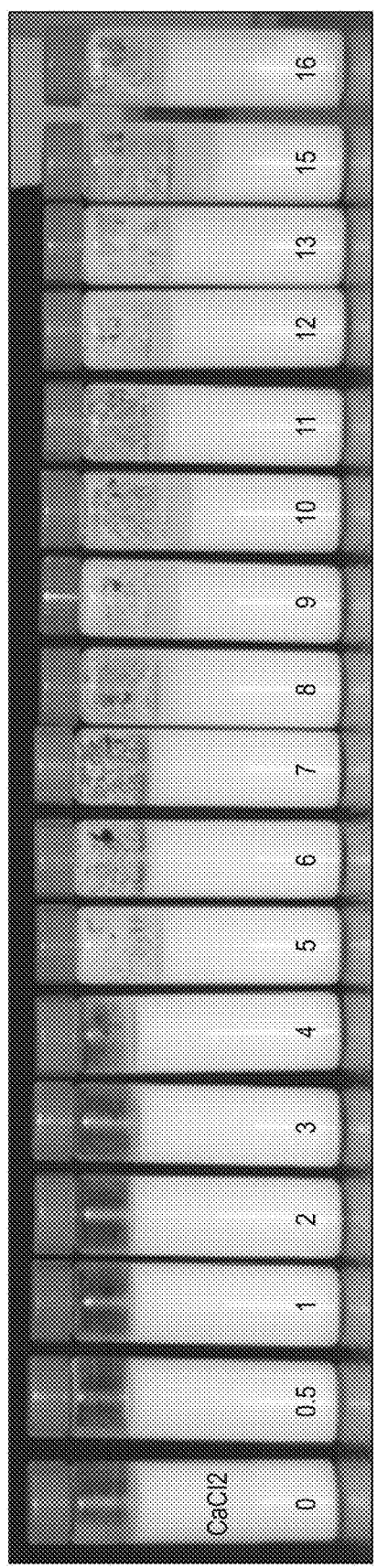
FIG. 1 shows the glass tubes after heat treatment of 3.5 wt. % milk at 90° C. for 15 minutes upon addition of calcium chloride. The labels on the tubes represent the amount of free calcium in mM added in the sample. The critical free calcium concentration to induce protein aggregate formation leading to viscosity increase was 3.7 mM, corresponding to 4 mM CaCl2 addition.

When carrying out experiments on the effect of divalent cations addition, in particular calcium, to full fat milk on protein aggregation and viscosity built up, it was surprisingly found that there is a critical range of divalent cations addition leading to optimum protein aggregation without precipitation or gelation of the formed aggregates upon heating. When this optimum concentration of calcium is passed, the system either exhibited over-aggregation with precipitation or a decrease of aggregate size.

Without being bound to theory, it is likely that calcium chloride addition to proteins is leading to an exchange between the protons adsorbed at the surface of the proteins and the calcium ions which have a higher affinity. This phenomenon resulted in a decrease of the pH of the dispersion and thereby a decrease of electrostatic repulsions between proteins. In these conditions, subsequent heat treatment of milk or milk based dispersions and emulsions is leading to a controlled aggregation of the proteins which was shown to affect positively the textural and sensorial properties of the finished products.

A major advantage of this invention is that it allows to texturize reduced fat milk-protein based systems and enables a reduction or elimination of the use of additional hydrocolloids and/or emulsifiers.

In the present context the agglomerates created with the method according to the invention and present in the product of the invention have a size of 5-50 microns as measured by $D_{(4,3)}$ mean diameter. The agglomerate particle size distribution is measured (PSD) using a laser granulometer such as a Mastersizer 2000 (Malvern Instruments, UK). For the measurements a sample may e.g. be dispersed in the Hydro SM measuring cell until an obscuration rate of 9-10% is obtained and then analysed in the Mastersizer.

Further in the present context the free divalent cations may be measured by means of a selective electrode. For example, free (ionic) calcium concentration is determined a Mettler Toledo calcium selective electrode perfection™ DX series half cells with BNC connector P/N 51344703 connected to a 692 pH/Ion meter (Metrohm Switzerland).

Further in the present context unless otherwise indicated % of a component means the % of weight based on the weight of the composition, i.e. weight/weight %.

In addition by "frozen aerated confectionery" is meant any aerated product such as ice cream, sorbet, mellorine, milk shake, any frozen dessert etc.

Furthermore, in the present context "stirring" means moving the ingredient composition. The stirring may result in a shearing of the ingredient composition. If it does it is preferred that this is done without destroying the agglomerates.

In a preferred embodiment of the invention the aggregates are 10-40 microns, preferably 10-30 microns. This give a desirable mouth feel to the product without the aggregates providing grittiness.

In accordance with the invention it is preferred that the divalent cations are selected from the group consisting of Ca and Mg cations or a combination thereof. These divalent cations are food grate and do not contribute to increase fat oxidation.

In a preferred embodiment of the invention the divalent cations are calcium cations.

Advantageously, the divalent cations are added to until the free divalent cations concentration is 3.5-6.5 mM divalent cations. It has been found that amounts that need to be added in milk or food products are 3-25 mM.

Furthermore, it is preferred that the divalent cations are added in form of a mineral salt. Preferably the mineral salt is calcium salt is selected from to the group consisting of calcium chloride, calcium lactate calcium gluconate or calcium phosphate. In a particular preferred embodiment of the invention the calcium salt is calcium chloride. In an all-natural embodiment of the invention the calcium is obtained from concentration minerals from milk after separation of the protein, fat and lactose by e.g. membrane fractionation.

In accordance with the invention the pH of the ingredient composition is preferably 6.2-7.1 before adding the calcium cations.

The content of soluble protein in the ingredient composition is preferable below or equal to 30% in relation to the total protein content indicating that the majority of the proteins are in the form of aggregates.

In one embodiment of the invention the ingredient composition comprises from 0-36 wt. % fat, preferably 1.0-20 wt. %, more preferably 3.0-15 wt. %, most preferably 5-10 wt. % of fat. It has been found that even with low amounts of fat the texture of the product is still perceived as creamy due to the agglomeration created within the product.

The caseins and whey proteins in the ingredient composition are preferably provided in a form selected from the group consisting of raw milk, pasteurized milk, low heat concentrated milk, low heat milk powder, milk protein concentrate, milk protein isolate in liquid or powder format or a combination thereof while the additional whey proteins are provided in a form selected from the group consisting of sweet dairy whey, whey protein concentrates, whey protein isolates in liquid, concentrate or powder format or a combination thereof.

It has been found that the method according to the invention is particular useful for making ice cream. In this embodiment of the invention the ingredient composition is a mix is for frozen confection and comprises fat in an amount of 0.5-20 wt. %, milk solids non-fat in an amount of 5-15 wt. %, a sweetening agent in an amount of 5-30 wt. %, a stabiliser system in an amount up to 6 wt. %.

The mix may further comprises any flavours, colourings, water, acidifying components, alkalinising components.

For the making of frozen confection the ingredient mix may be frozen while optionally aerating the mix preferably to an overrun of at least 20%, preferably at least 40%, most preferably between 100% and 120% to form the aerated frozen confectionery product, and optionally hardened. In the making of frozen confection the product is optionally subjecting subject to a dynamic cooling at a temperature below −11° C. in a single or twin extruder.

The invention also relates to a food or beverage product obtained by the above described method. In a particular preferred embodiment of the invention the food product is a frozen confection obtained with the above described method.

In another aspect of the invention discussed above the invention relates to a food or beverage product comprising aggregated proteins comprising micellar casein and whey protein aggregates, wherein the product has a pH of 6.1-7.1, a concentration of 6-40 wt. % milk solids, a casein to whey protein ratio of 90/10-60/40, and a concentration of 3-8 mM free divalent cations, and wherein the agglomerates having a size of 5-50 microns mean diameter $D_{(4,3)}$ as measured by laser diffraction. For this product it is preferred that the product has free divalent cations in the product is 3.5-6.5 mM. The divalent cations is preferably selected from divalent cation Ca and Mg or a combination thereof. The product may comprise 1.0-15 wt. % of protein.

In the product according to the invention it is advantageously that the content of soluble protein in the product is below or equal to 30% as related to the total protein content.

Furthermore, it is preferred that product comprises from 0-20 wt. % fat, preferably 2.0-15 wt. %, most preferably 2.5-10 wt. % of fat. It has been found that even at 0 or low fat content products with a desirable mouth feel can be obtained. The product according to the invention may have initial fat (present before heat treatment) droplets having a size of 0.5-2.0 microns are flocculated in protein aggregates of 5-50 microns.

The product according to the invention may have an at least partially aggregated protein system which is obtained by subjecting a composition to a heat treatment 80°-100° C. for a period of 0.5-3 minutes.

The micellar casein may be obtained from the group consisting of milk, milk protein concentrate and isolate in a liquid or powder form or a combination thereof.

Products according to the invention may be dairy based products such as ice cream or frozen confection, dairy concentrates or desserts, sauces etc. The product format includes frozen, ambient, liquid and powder.

EXAMPLES

By way of example and not limitation, the following examples are illustrative of various embodiments of the present invention.

Example 1

Milk Protein-Based Aggregates Obtained by Calcium Chloride Addition in Heated Full Fat Milk.
Material and Methods Chilled pasteurised and microfiltered full fat milk (3.5 wt. % fat) was provided by Cremo S. A. (Le Mont-sur-Lausanne, Switzerland). It had an initial pH of 6.77 as measured at 25° C. For calcium addition a solution of $CaCl_2$, $2(H_2O)$ (Merck, Darmstadt, Germany) was prepared at 200 mM in MilliQ water. A volume 50 mL of milk were introduced in a Pyrex glass bottle of 50 ml (Schott Duran type, Germany)

for each calcium chloride solution addition to cover a free calcium addition ranging from 1-16 mM. Magnetic stirring was performed 300 rpm and at room temperature 20-23° C.

After calcium chloride addition, 20 mL of milk were introduced in a 22 mL sealed glass tube containing a magnetic barrel. The closed tubes were partially (2/3) immerged for 15 min in a water bath regulated at 92.5° C. in order to reach a product temperature of 90° C. in 3 minutes. The incubation was done under magnetic stirring (500 rpm) to ensure shearing of the samples. After incubation the tubes were transferred in iced water for cooling.

The capillary viscosity was determined using Rheotest LK 2.2 (Medingen GmbH, Dresden, Germany) and the particle size distribution (PSD) using Mastersizer 2000 (Malvern Intruments, UK).

The direct visual appearance of the tubes was done to detect the first free calcium chloride concentration where protein aggregates were formed. Ionic (free) calcium concentration after heating was determined a Mettler Toledo calcium selective electrode perfection™ DX series half cells with BNC connector P/N 51344703 connected to a 692 pH/Ion meter (Metrohm Switzerland).

Results

Systems did not gel proving that the interactions between the protein aggregates could be controlled by applying shearing in the tubes while heating.

Example 2

Calcium Addition in Milk Protein Concentrate Stabilized Emulsions

Material and Methods

The stock solution of micellar caseins dispersion was prepared at a protein concentration of 10 wt. %. Micellar caseins concentrate Promilk852B (batch 13610656) was purchased from Ingredia (Arras, France). The powder composition was (g/100 g wet powder):protein (Nx6.38) 82.3, Ca 2.6, Mg 0.1, Na 0.07, K 0.29, Cl 0.05, P 1.56. The mass of powder needed to prepare the dispersion was calculated as a function of the protein content in the powder.

Micellar casein powder was hydrated in MilliQ water for 3 hours under stirring at the room temperature. After 3 hours, the protein dispersion was homogenized with an EmulsiFlex C-5 high pressure, single-stage homogenizer (Avestin®, Canada). This treatment decreased the average particle size of micellar caseins and the amount of non-sedimentable

TABLE 1

Initial pH, particle mean diameters and viscosity of full fat milk before and after heating at 90° C. for 15 min.

| CaCl2 added (mM) | pH | D [4, 3] – Volume weighted mean (um) | D [4, 3] – Surface weighted mean (um) | η (mPas) 20° C. | +/– | free Ca++ (mM) | final pH | D [4, 3] – Volume weighted mean (um) | D [4, 3] – Surface weighted mean (um) | η (mPas) 20° C. | +/– |
|---|---|---|---|---|---|---|---|---|---|---|---|
| 0 | 6.77 | 0.632 | 0.359 | 1.99 | 0.04 | 1.99 | 6.63 | 0.648 | 0.369 | 2.06 | 0.07 |
| 0.5 | nd | nd | nd | nd | nd | 2.20 | 6.67 | 0.599 | 0.308 | 2.13 | 0.06 |
| 1 | nd | nd | nd | nd | nd | 2.53 | 6.66 | 0.609 | 0.315 | 2.11 | 0.06 |
| 2 | nd | nd | nd | nd | nd | 2.93 | 6.63 | 0.598 | 0.302 | 2.07 | 0.06 |
| 3 | nd | nd | nd | nd | nd | 3.41 | 6.58 | 0.624 | 0.294 | 2.08 | 0.05 |
| 4 | nd | nd | nd | nd | nd | 3.77 | 6.54 | 42.80 | 6.20 | 2.43 | 0.06 |
| 5 | nd | nd | nd | nd | nd | 4.24 | 6.50 | 217.27 | 190.52 | 3.52 | 0.04 |
| 6 | nd | nd | nd | nd | nd | 4.50 | 6.46 | 296.74 | 207.63 | 3.92 | 0.02 |
| 7 | 6.61 | 0.625 | 0.349 | 1.88 | 0.02 | 5.25 | 6.44 | 207.09 | 35.19 | 3.93 | 0.08 |
| 8 | nd | nd | nd | nd | nd | 5.80 | 6.41 | 138.98 | 40.72 | 4.80 | 0.11 |
| 9 | nd | nd | nd | nd | nd | 6.36 | 6.40 | 134.17 | 44.42 | 5.31 | 0.13 |
| 10 | nd | nd | nd | nd | nd | 6.91 | 6.37 | 113.03 | 41.19 | 6.30 | 0.20 |
| 11 | nd | nd | nd | nd | nd | 7.55 | 6.34 | 123.64 | 37.74 | 6.27 | 0.19 |
| 13 | nd | nd | nd | nd | nd | 8.09 | 6.30 | 177.75 | 55.80 | 5.79 | 0.51 |
| 14 | nd | nd | nd | nd | nd | 8.89 | 6.28 | 155.64 | 54.94 | 6.27 | 0.24 |
| 15 | nd | nd | nd | nd | nd | 9.35 | 6.27 | 269.81 | 79.34 | 6.12 | 0.40 |
| 16 | 6.36 | 0.528 | 0.253 | 1.86 | 0.05 | 10.10 | 6.24 | 173.10 | 58.53 | 5.89 | 0.20 | nd: not determined

It can be seen from Table 1 that the original milk already contained 2 mM free ionic calcium in the form of soluble colloidal calcium. The addition of CaCl2 in milk was leading to an increase in free ionic calcium but also to a decrease of pH after heating. Up to an added calcium chloride concentration of 4 mM (corresponding to 3.8 mM measured free calcium) the particle size in the heat milk remained around 600 nm for D43 and 300 nm for D32 which is corresponding to the size of protein coated milk fat droplets and to the casein micelles. Above this critical CaCl2 value, larger particles are being formed reaching hundreds of microns for D43 and D32. These aggregates are visible on the surface of the glass tubes in FIG. 1. Surprisingly, the size of protein-based aggregates reaches a maximum at about 6 mM CaCl2 and then decreased steadily while more calcium was present in the system. The viscosity of the system increases with the increase of the calcium chloride content.

caseins (κ, αs1; and αs2) in serum increases, it allows to stabilize the solution and avoids the sedimentation of the MCI.

The average particle diameter was determined after the homogenization using a Nanosizer ZS (Malvern Instruments®, UK) and it was monodisperse and around 250 nm.

Emulsion Preparation

O/W emulsions were prepared by the addition of high oleic sunflower oil (Oleificio Sabo, Manno, Switzerland) to the proteins dispersions so that total sample resulted in oil content of 2.5, 5 and 10 wt. % and a constant protein content of 3 wt. %. The mixtures were subsequently pre-homogenized using an Ultra-Turrax T25 basic (IKA®, Switzerland) at 11,000 rpm/min during 1 minute for a volume of 500 mL. The pre-homogenized emulsions were after homogenized at High Pressure with a PandaPLUS HomoGenius 2000 (GEA®, Germany) adjusted at 50 bars for the first valve and at 250 bars for the second one, to obtain a pressure total of 300 bars.

Emulsions were homogenized twice by this method. After homogenization, pH and concentration of CaCl2 were adjusted to defined target values. Samples with different pH were heated up at 95° C. during 15 min in a hot water bath just after have been prepared and 1 hour after for different concentration of CaCl2. Emulsions were after cooled in iced-water during 20 min and stored at 4° C. during 1 hour.

The samples were afterward sheared at 16,000 rpm during 2 min using a Ultra-Turrax T25 basic (IKA®, Switzerland) in a beaker for a volume of 60 mL, thirty circles were applied in order to have the same shearing for all the volume. Emulsions were after stored at 4° C. until the analyses were done.

Particle Size Distribution

In order to assess particles size distribution, dispersions and emulsions were analyzed after shearing by dynamic light scattering using a MasterSizer 3000 (Malvern Instruments Ltd®, UK). The emulsion sample was dispersed in the Hydro SM measuring cell until an obscuration rate of 9-10% was obtained. Non-heated and heated samples were analyzed. Measures were performed three times and the average of the three replications was reported.

Microstructure of Protein Aggregates

Cryo-Sectioning of Samples

Cryogenic cuts were done in order to analyze samples by CLSM. To this aim, sucrose and formaldehyde were added at the samples in order to conserve them (PRICE and JEROME, 2011). Percentage are for the sucrose 30 wt. % of the total volume and 3.7 wt. % for the formaldehyde. Samples were homogenized using a vortex and stored overnight at 4° C. before beginning analyses.

Afterwards, samples were fixed. This step consisted of adding 0.5 g of the sample in 1 g of Optimum Cutting Temperature (OCT) Compound for Cryostat Sectioning, Tissue-Tek®. The composition was homogenized and 0.1 g were added in the cryostat sample holder, itself containing already OCT Compound for Cryostat Sectioning, Tissue-Tek®.

The cryostat sample holder was immersed in a plastic vial containing 80 mL of 2-Methylbutane (99% from Sigma Aldrich®, US), itself immersed in Sagex box of nitrogen liquid. The solution of 2-Methylbutane ensures a good freezing of the sample and protects it from the drying.

Samples were then placed in a Cryostat CM 3050 (Leica®, Switzerland). Microtome cuts were afterwards done at 7 μm of thickness at −21° C. Microscope slides were conserved in a freezer at −20° C. until the analyses were performed.

Microscope slides were previously treated with HistoGrip (50× concentrate from ThermoFisher Scientific®, US) for adhering tissue to glass slides and avoid to remove tissues during harsh processes.

Confocal Scanning Laser Microscopy

In order to distinguish proteins and fat globules, individual samples 100/0 (MCI/SPI) and 0/100 (MCI/SPI) were labelled with dyes.

Fast Green was used to color proteins and Nile Red for fat globules. According to FOWLER et al., 1985, Nile Red is an excellent dye for the detection of intracellular lipid droplets by fluorescence microscopy, it is highly hydrophobic and fluorescent. 25 mg of Nile Red was solubilized in 100 mL of ethanol. The excitation wavelength was achieved using the 488 nm emission from the diode laser and the emitted light was collected between 488 nm and 630 nm.

Fast Green is an organic dye, electrostatically attracted to charged groups on proteins (MERRIL and WASHART, 1998). It can bind non-covalently to the biopolymer of interest by electrostatic interactions (AUTY, 2013). The excitation wavelength was set using the 633 nm emission from the diode laser and the emitted light was collected between 633 nm and 740 nm. The Fast Green used was at 1 wt. % in water.

Samples were dyed with a mix of Nile Red (100 μL) and Fast Green (3 mL). The mix was put on the microscope slides for 10 min and rinsed. Slides were mount with a set mounting Vectashield Hard Set Mounting Medium (Vector Laboratories®, US).

Microscope slides were after analyzed using a Zeiss® LSM 710 Confocal Scanning Microscope (Zeiss®, Germany). The CLSM is equipped with lasers allowing the excitations of several fluorescent probes at the same time, this capability allows multi-imaging of a sample by selecting the correct excitation wavelength and filters to collect the emission light from a particular dye. A 10×/0.45∞/0.17/PL APO and 63×/1.4 oil/DIC 420782-9900/PL APO was used for all images.

Flow properties One day after shearing, flow experiments were performed using a controlled stress rheometer Physica MCR501 (Anton Paar®, Austria) with concentric cylinders geometry CC27-SS/S (diameter=27 mm, gap=1.14 mm by Anton Paar®, Austria).

Steady state flow measurements were conducted in a constant temperature of 25° C., a shear stress of 100 l/s was applied to the samples during 5 min, following by four shear rates, one from 0.1-500 l/s and one other from 500-0.1 l/s, these were done twice; 15 measurements each 30 s were done. The apparent viscosity was recorded as a function of the shear rate.

For each measurement, an aliquot (19 mL) of the emulsion sample was poured into the cup. Measures were performed three times and the average of the three replications was reported.

Soluble Protein Content

In order to characterize content in soluble proteins in the products from the invention, emulsions were centrifuged at 16,000 g at room temperature for 20 min using an Eppendorf® centrifuge 5418 (Vaudaux-Eppendorf AG®, Switzerland), one day after production. Supernatant was carefully withdrawn and stored at 4° C. in order to be analyzed by Reverse Phase-Ultra Performance Liquid Chromatography (RP-UPLC).

The UPLC system (Waters Corp Milford Ma, USA) consisted of a binary pump, a temperature controlled autosampler (sample manager-UPSMPM6R) and a photodiode array detector (UPPDA-E). The equipment was controlled by the Empower® 3 software, Pro version.

Separations were performed on a reversed-phase analytical column Acquity UPLC® BEH300 C4 1.7 μm 2.1×150 mm (Waters Corp Milford Ma, USA) and on VANGUARD™ Pre-column BEH300 C4 1.7 μm 2.1×5 mm (Waters Corp Milford Ma, USA). UPLC vials were kept at constant temperature 8° C.±2° C. and injected by the sample manager system. A 500 μL injection syringe and a 250 μL injection loop were used.

Standards of caseins were prepared at concentrations of 0.1, 0.3, 1, 3, and 5 wt. % by dilution in milliQ water from a 10 wt. % reference solution. In a 1.5 mL Eppendorf® microtube, 200 μL of the sample and 800 μL of buffer {Guanidine-HCl 7,5 M; Trisodium Citrate 6.25 mM; DTT 23 mM} were added. The sample's and buffer's masses were accurately weighted. The composition was then homogenized using a vortex and incubated in an Eppendorf® Thermomixer Compact (Vaudaux-Eppendorf AG®, Switzerland) at 60° C. for 10 min at 650 rpm.

After incubation, samples were homogenized and centrifuged at 16,000 g for 10 min at room temperature using Eppendorf® centrifuge 5418 (Vaudaux-Eppendorf AG®, Switzerland). Supernatant was then carefully withdrawn and introduced in a UPLC Vial, watching out for the fat layer and also to not suspend the pellets if presents. The injection volume was variable from 30 μL-150 μL, adapted to the sample's protein content (determined by Kjeldahl method, Nx6.38) to have sufficient signal. The standards were also injected with adjusted volumes in order to consider variability.

A gradient elution was carried out with two solvents mixed during the elution. Solvent A consisted of 0.1% TFA in water and solvent B was 0.1% TFA in acetonitrile/water (90/10) (v: v). Separations were performed with a linear gradient from 15-35% B in 4 min (5% B·min$^{-1}$), 35-47% B in 24 min (0.5% B·min$^{-1}$) and from 47% B-80% B in 4 min (8.25% B·min$^{-1}$). This was followed by an isocratic elution at 80% B during 1 min. Then returned linearly to the starting condition in 2 min, followed by the rebalance of the column for 5 min.

The flow rate was 0.6 mL·min$^{-1}$ and the column temperature was kept constant at 40±1° C. The acquisition was achieved at λ=214 nm (resolution 2.4 nm–20 points/sec– Exposure time automatic).

Each chromatogram was manually integrated. For calibration curves, the total area was plotted as a function of proteins amount injected. The soluble protein content was calculated from the ratio of protein amount present in the supernatant after centrifugation and the total amount of protein present in the emulsion without centrifugation and expressed in percentage.

Results

Particle Size Distribution

Figure 2:
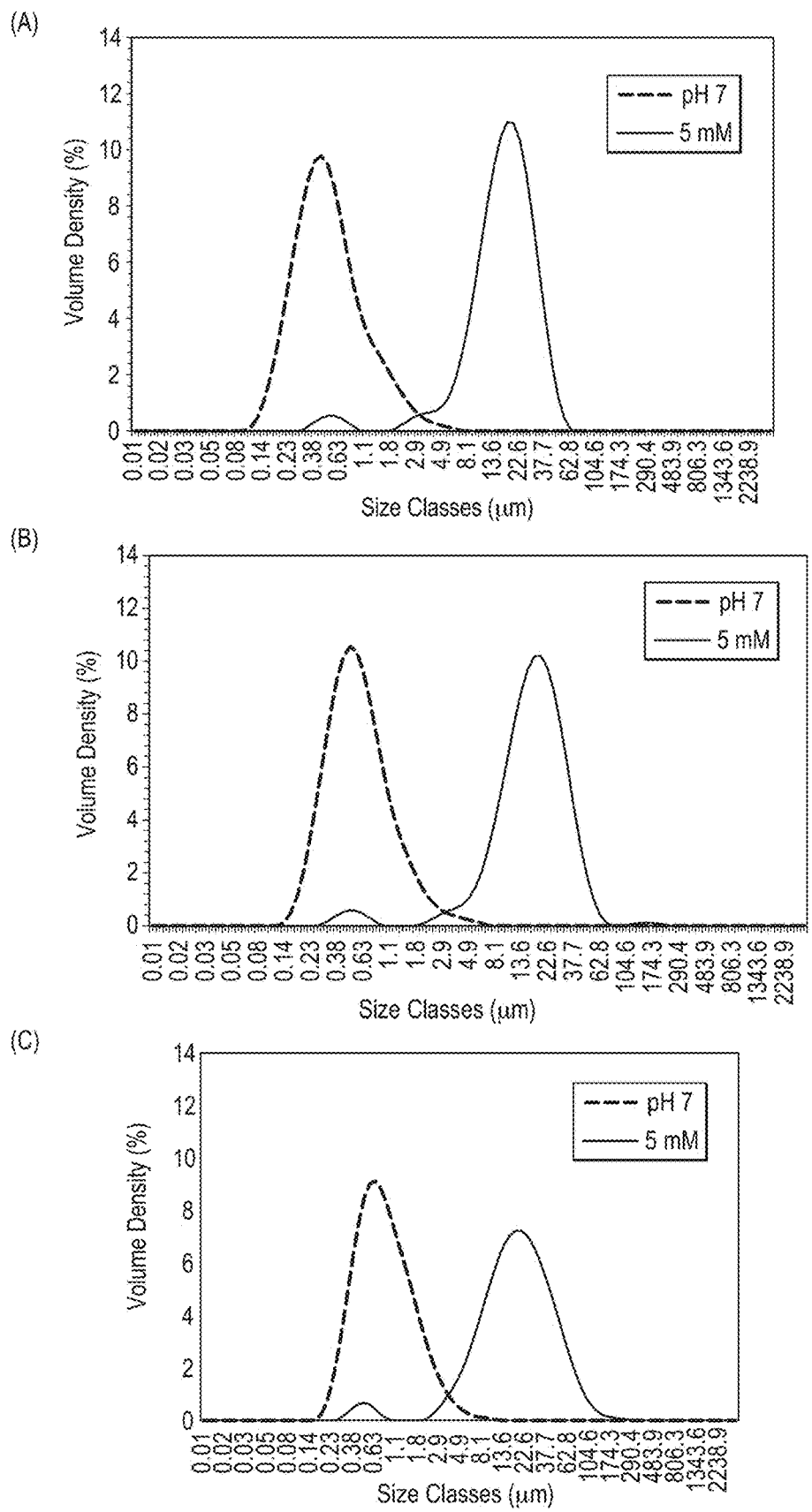
FIG. 2 shows particle size distribution of emulsions stabilized by 3 wt. % micellar casein isolate at pH 7.0 or after addition of 5 mM CaCl2 and heating at 95° C. for 15 min as described in example 2. (A) 2.5 wt. % oil emulsion, (B) 5 wt. % emulsion, (C) 10 wt. % emulsion.

FIG. 2 shows that upon heat treatment and shearing, the size distribution of the emulsions at pH 7.0 exhibit a peak around 400-600 nm for the 3 sunflower oil content tested. On the contrary, larger particles are formed when the heat treatment in achieved in presence of 5 mM added fee calcium. Hence, there is a clear shift of the size distribution to around 15-25 microns, indicating that the initial oil droplets had aggregated into larger protein based particles.

Microstructure

Figure 3:
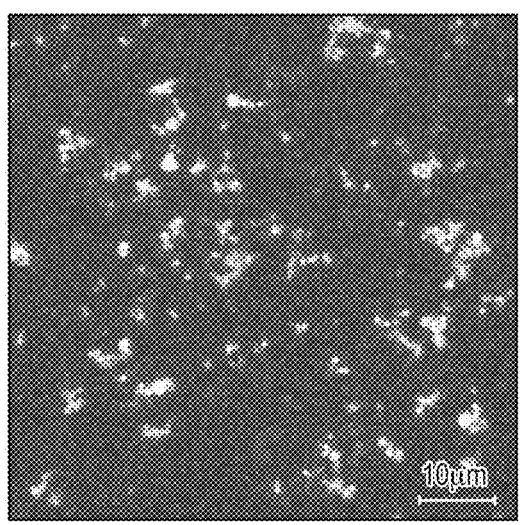
FIG. 3 shows a confocal scanning laser micrographs of 3 wt. % milk protein concentrate stabilized high oleic sunflower emulsion after heat treatment and shearing at 95° C. for 15 min at pH 7.0. (A) 2.5 wt. % oil, (B) 5 wt. % oil, (C) 10 wt. % oil. Scale bar is 10 microns.
Figure 3:
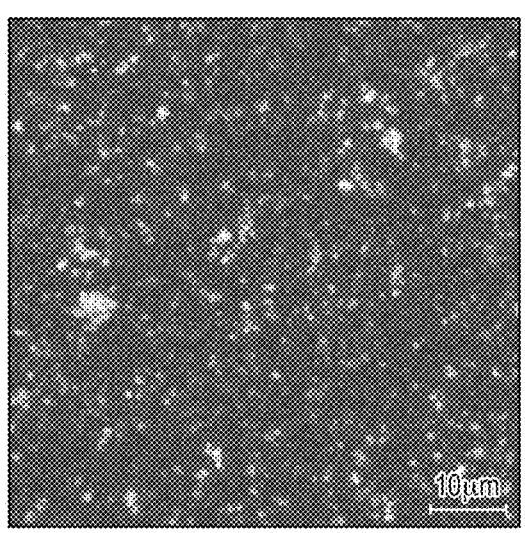
Figure 3:
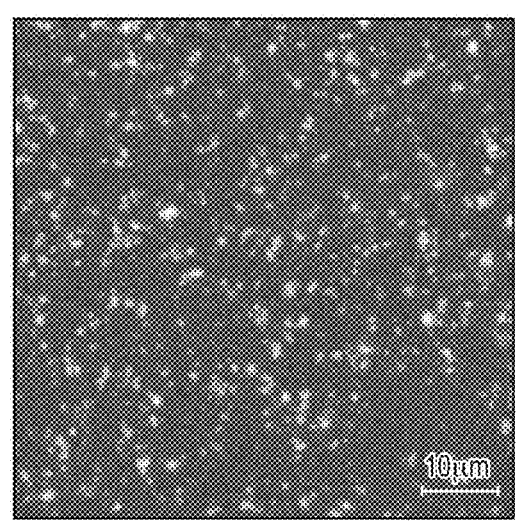
Figure 4:
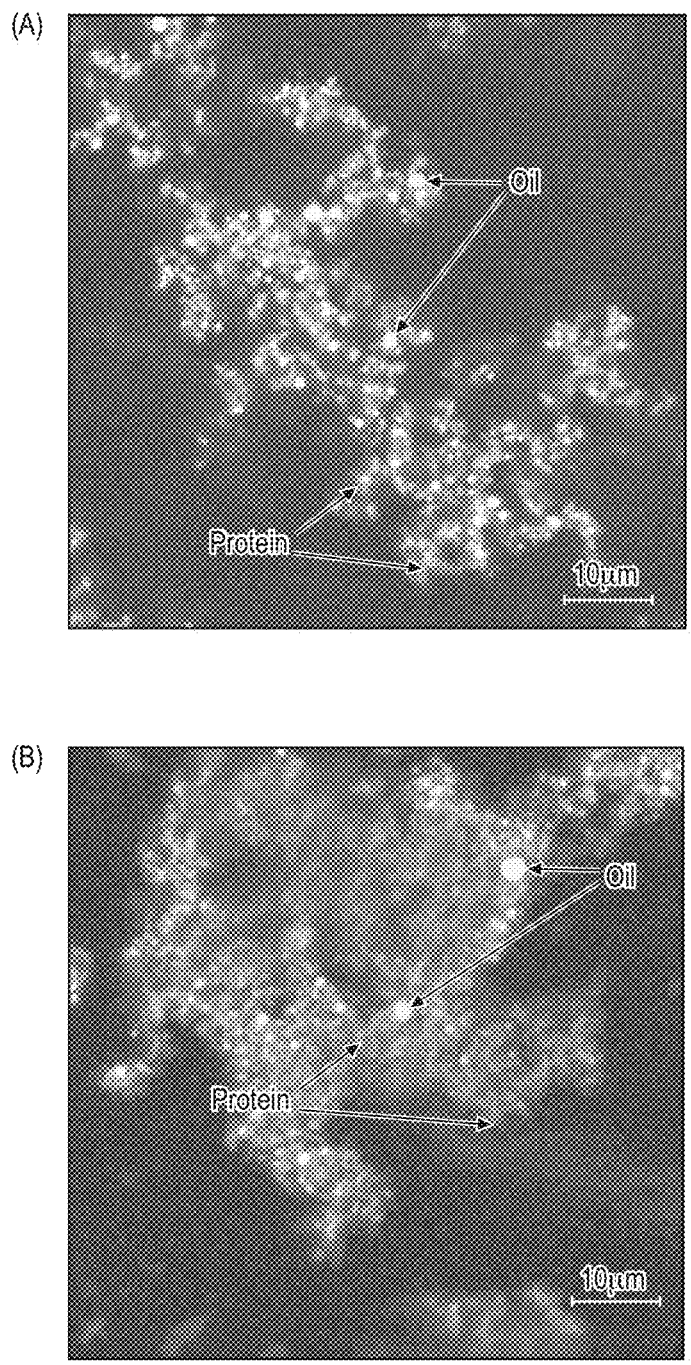
FIG. 4 shows a confocal scanning laser micrographs of 3 wt. % milk protein concentrate stabilized high oleic sunflower emulsion after heat treatment and shearing at 95° C. for 15 min in presence of 5 mM CaCl2. (A) 2.5 wt. % oil, (B) 5 wt. % oil, (C) 10 wt. % oil. Oil droplets and protein phase are shown by arrows. Scale bar is 10 microns.
Figure 4:
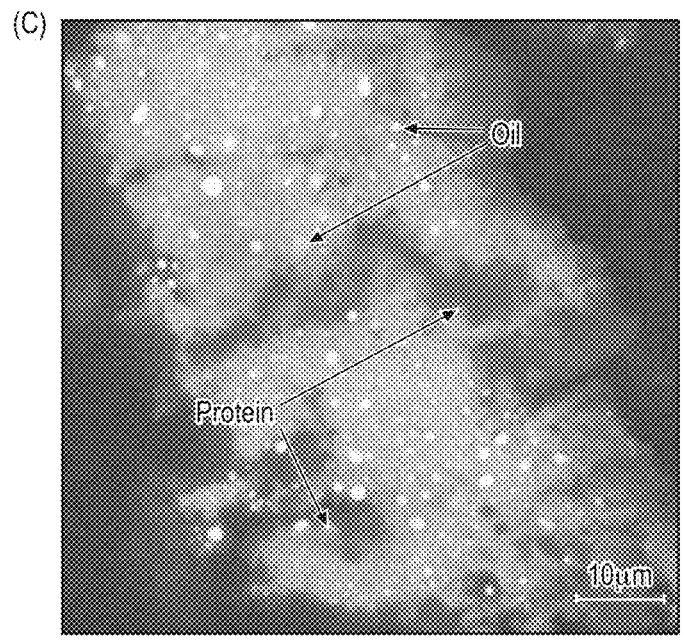

The microstructure of the protein based aggregates is clearly shown on FIG. 3. More numerous aggregates were obtained when the oil content in the emulsion was increased (FIG. 3A to 3C). Interestingly, larger magnification of the particles show that these are composed by oil droplets tightly included in a surround protein matrix (FIG. 4).

The higher the sunflower oil content in the emulsion, the more compact and spherical the shape of the particles was (FIG. 4C). On the contrary, more branched and elongated particles were obtained for the lowest oil content (Figure A). The soluble protein content in the emulsion at 5 wt. % oil was found to be 76% at pH 7.0 while upon heat treatment in presence of 5 mM calcium chloride, it was found to be about 3% as revealed by UPLC analysis.

Flow Properties

Figure 5:
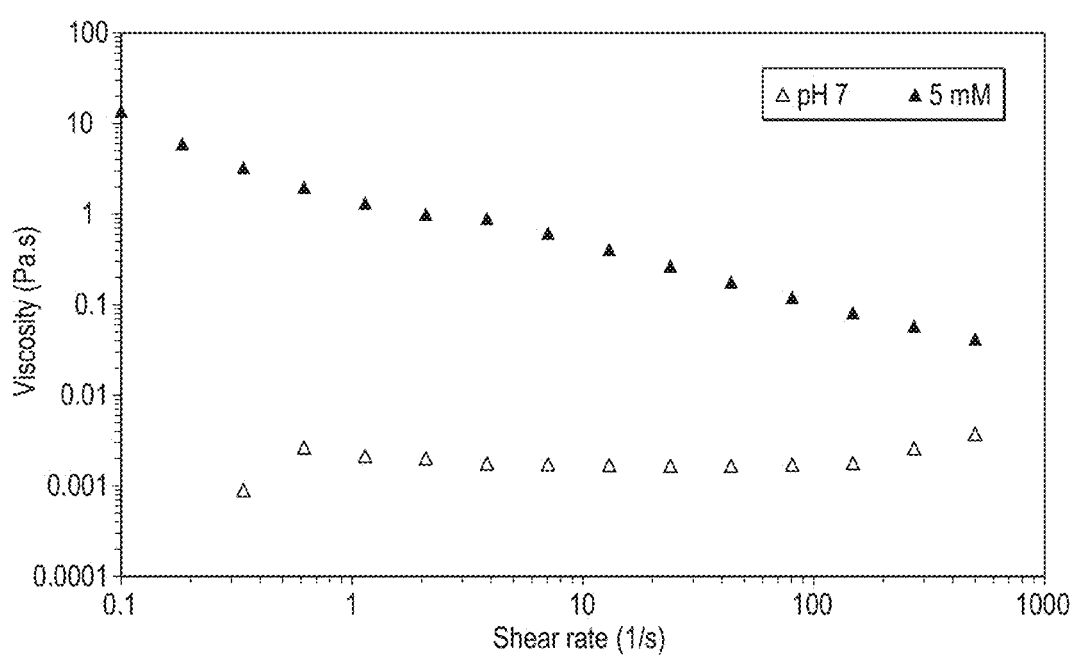
FIG. 5 shows a flow curve at 20° C. for 3 wt. % milk protein concentrate stabilized high oleic sunflower 5 wt. % emulsion after heat treatment and shearing at 95° C. for 15 min at pH 7.0 or in presence of 5 mM CaCl2.

The flow properties of emulsion produced with 5 wt. % oil was compared after heat treatment and shearing at pH 7.0 and after addition of 5 mM CaCl2. The flow properties are shown in FIG. 5.

Figure 6:
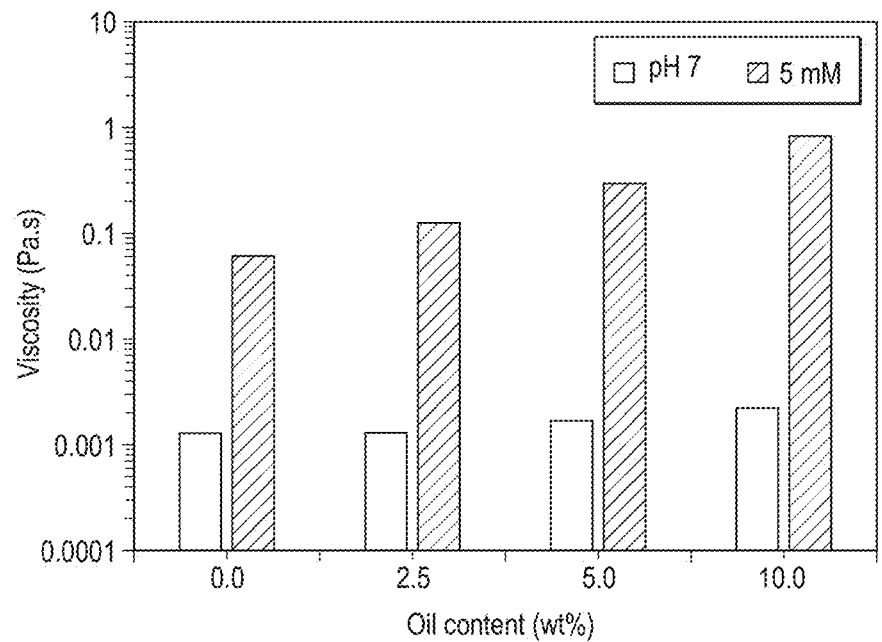
FIG. 6 shows viscosity at a shear rate of 10 s$^{-1}$ for 3 wt. % milk protein concentrate stabilized high oleic sunflower emulsions after heat treatment and shearing at 95° C. for 15 min at pH 7.0 or in presence of 5 mM CaCl2.

The emulsion produced at pH 7.0 exhibited a Newtonian flow behaviour with an independence of the viscosity as a function of shear rate. This is explained by the fact that viscosity is mainly driven by the oil volume fraction and that the oil droplets are not interacting. In the sample of the present invention containing 5 mM calcium, the flow behaviour is shear thinning, which is an indication that shear sensitive particles have been produced, affecting the overall flow behaviour. The sample viscosity is compared for the 3 sunflower oil contents tested at a shear rate of 10 s$^{-1}$ which is relevant for in-mouth conditions (see FIG. 6). It can be seen that at pH 7.0, the viscosity slightly increases with increasing the oil content. For samples of the present invention prepared in presence of calcium, the viscosity was about 10-100 times larger than the corresponding sample at pH 7.0. This clearly indicates that the particles of the present invention enables to build viscosity at a much lower oil content, enabling fat lowering in food products, see FIG. 5.

Example 3

Calcium Addition in Double Concentrated Milk, Heat Treatment and Spray Drying

Material and Methods

A set of 2 samples were produced according to the following procedure, involving: concentration of a commercial whole milk to 35% total solids (TS) content, adding a variable amount CaCl2 (5 and 10 mM) in the milk concentrate, standardized heat processing including a direct steam injection step, and spray drying to obtain a functionalized milk powder.

Commercially available, pasteurized and microfiltered, homogenized whole milk (3.5% fat content, Cremo, Le Mont-sur-Lausanne, CH) is concentrated to a total solid content as indicated in the table 2, with a Centritherm® CT1-09 thin film spinning cone evaporator (Flavourtech Inc., AU). The concentration process is done in recirculating batch mode, starting with milk at 4° C. The milk is pumped with a progressing cavity pump, from a buffer tank through a plate heat exchanger set to 40° C. outlet temperature and the Centritherm® CT1-09 evaporator, back into the buffer tank.

The milk in the buffer tank thereby gradually increases in solid concentration and temperature. When a critical concentration threshold is reached, the milk is brought to the desired total solids content by a final evaporator pass without remixing, and collected in a separate holding tank.

The following process parameters are used: flow rate 100 l/h, evaporator inlet temperature 40° C., evaporator vacuum pressure 40-100 mbar, evaporator steam temperature 90° C.

This results in concentrate outlet temperatures of around 35° C., and evaporate flow rates which decrease gradually from about 50 l/h-30 l/h with increasing milk concentration. High product flow rates around 100 l/h and a stable product inlet temperature of 40° C. are important to avoid fouling of the milk concentrate on the heat exchange surface of the Centritherm® device.

The milk concentrate is cooled to 10° C. and the required amount of CaCl2, 2H20 powder (Merck, Darmstadt, Germany) was added, under agitation, to the milk. The typical timeframe for calcium powder addition to a 40 kg batch is about 15 minutes.

The cooled, calcium loaded milk concentrate was heat-processed in semi-continuous mode on a commercially available OMVE HT320-20 DSI SSHE pilot plant line (OMVE Netherlands B.V., NL). Processing steps are: pre-heating in the OMVE tubular heat exchanger to 60° C., direct steam injection to 95° C. outlet temperature, 300 sec hot holding period at 95° C. in the two scraped surface heat exchangers of the OMVE line, connected in series and running at maximum rpm, and subsequent cooling to about 23° C. product outlet temperature the OMVE tubular heat exchanger cooled with ice water. The flow rate is set to 14 l/h to obtain a sum of approximately 300 sec residence time in the scraped surface heat exchanger units. Residence time in the OMVE cooler is about 2 minutes. The residence times are averages from volumetric flow rates and dead volume of line elements (tubular heat exchanger, scraped surface heat exchanger).

Clogging of the DSI injector is a critical phenomenon, and the line must be carefully controlled in this respect. No flash evaporation is applied and condensing steam remains entirely in the product.

The heat-processed milk concentrate with 5 mM calcium added was spray-dried on a Niro SD 6.3 pilot plant spray tower (GEA NIRO Process Engineering, DK), equipped with a FS1 rotary atomizer. Operating parameters are: Product feed rate 10-20 kg/h, product inlet temperature in the rotary atomizer 25-30° C., rotary atomizer speed 25000 rpm, airflow 350-400 kg/h (mass flow control), air inlet temperature 160° C., exhaust air temperature 80° C. and exhaust air relative humidity 15%. The finished powder product is packed immediately in air-tight bags and has a residual humidity below 4%.

The same methods as those used in example 2 were used to characterize sample size distribution, microstructure and flow properties. For the experiments carried on spray dried powder containing 5 mM CaCl2, sample was reconstituted to 13 or 50% TS before measurements. Distilled water was poured into a beaker and heated up to 42° C.-44° C. with a water bath. A volume of 150 mL distilled water at 42° C.-44° C. was measured and transferred into a glass beaker using a volumetric cylinder. An amount of 22.5 g milk powder is added to the 150 ml distilled water at 42° C. and mixed with a spoon for 30 s.

Results
Liquid Samples

TABLE 2

Mean average diameters D43 and D32 and viscosity at a shear rate of 13 s − 1 measured at 25° C. for double concentrated milk (25% TS) before and after heat treatment in presence of CaCl$_2$ at 95° C. for 300 s.

| Sample | pH | $D_{(4,3)}$ (microns) | $D_{(3,2)}$ (microns) | Shear viscosity at 13 s$^{-1}$ (mPa · s) |
|---|---|---|---|---|
| Non-heated 25% TS milk 5 mM CaCl$_2$ | 6.38 | 0.836 | 0.569 | 6.2 |
| Heated 25% TS milk 5 mM CaCl$_2$ | 6.39 | 28.40 | 9.42 | 349 |
| Non-heated 25% TS milk 10 mM CaCl$_2$ | 6.23 | 0.816 | 0.542 | 4.23 |
| Heated 25% TS milk 10 mM CaCl$_2$ | 6.24 | 66.80 | 11.20 | 150 |

It can be seen from table 2 that the samples of the present invention were exhibiting a marked increase in particle size after heat treatment leading to an increase in viscosity. It can be seen that in the presence of 10 mM calcium chloride addition, the D(4,3) increased to 66.8 microns which was leading to a slight sandiness of the sample. For this milk concentration, the best conditions and aggregation profile were obtained with 5 mM CaCl2 addition which can be inferred also by the higher viscosity reached (349 mPa·s) compared to 10 mM CaCl2 addition (150 mPa·s). After spray drying, the samples have been characterized upon reconstitution in MilliQ water.

Particle Size Distribution

Figure 7:
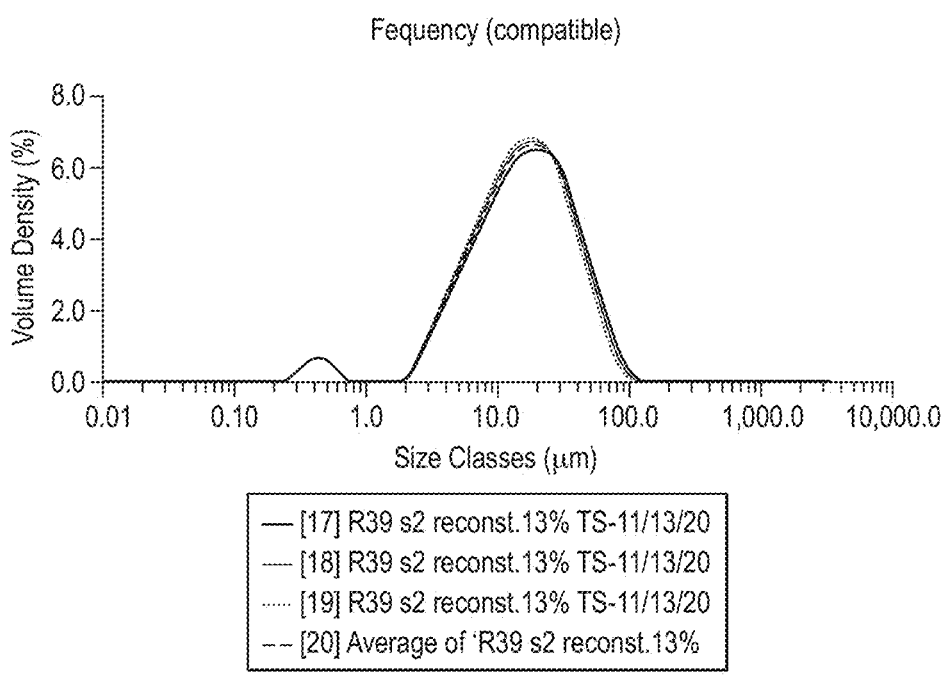
FIG. 7 shows the particle size distribution of double concentrated milk heated in presence of 5 mM calcium chloride after reconstitution of powder to 13% total solids.

The distribution of particles upon reconstitution is exhibiting a peak at about 20 microns (see FIG. 7) which is very close to the particle size obtained before spray drying (D(4,3)=28.4 microns, Table 2). The slight reduction in particle size might be due to the shearing effect occurring during the spray drying of the product. Surprisingly, the soluble protein content obtained after reconstitution of the powder at 13% TS was 7% of the total proteins, indicating that the majority of the milk proteins were involved in the aggregate structure.

Microstructure

Figure 8:
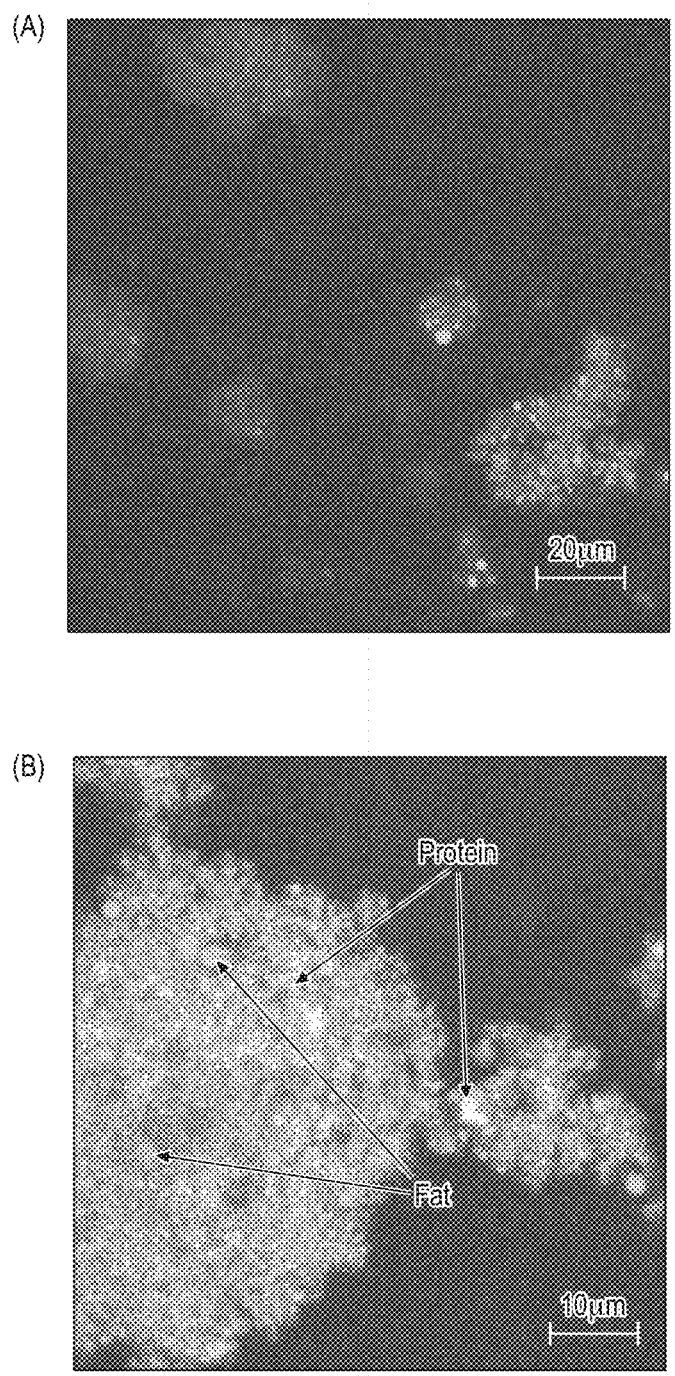
FIG. 8 shows a confocal scanning laser micrographs of double concentrated milk heated in presence of 5 mM calcium chloride after reconstitution of powder to 13% total solids. Scale bars are 20 and 10 microns on (A) and (B), respectively.

The microstructure of the particles can be seen on FIGS. 8 A and B. Aggregates were rather compacts and were composed of proteins and fat droplets with no sign of non-reacting proteins which is confirming the low amount of soluble proteins. Higher magnification of the particles on FIG. 8B shows well embedded fat droplets with an average size of 1-2 microns embedded in a dense protein matrix. There is little sign of fat droplet coalescence indicating that aggregate formation arose from a flocculation mechanism.

Figure 9:
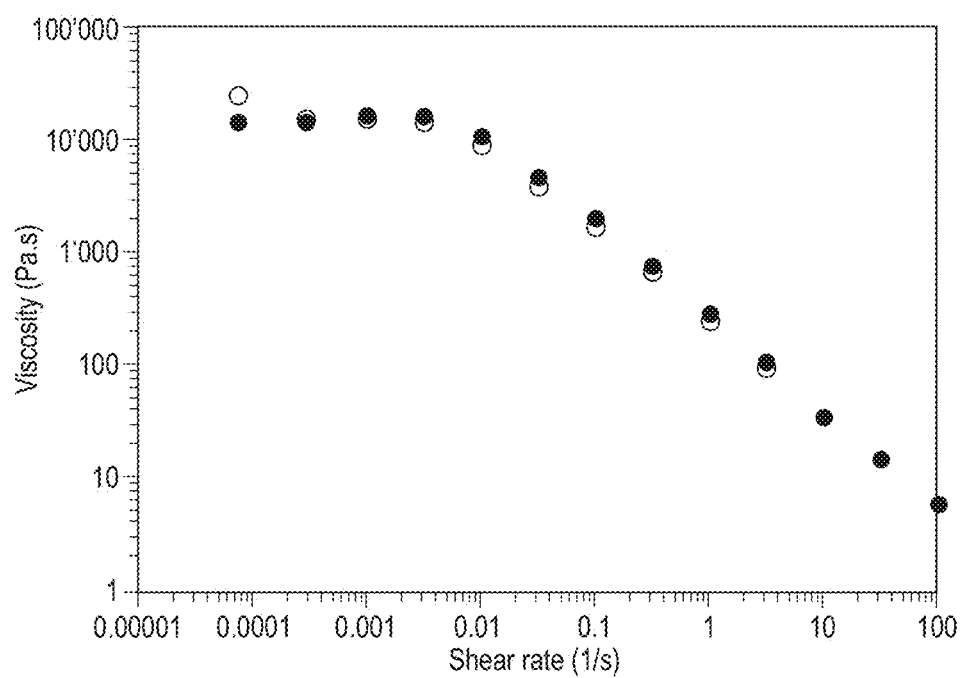
FIG. 9 shows a flow curve at 25° C. for 50% TS reconstituted milk powder from the invention with 5 mM calcium chloride added. Open circles: flow curve with increasing shear rate (up). Close circles: flow curve with increasing shear rate (down).

Flow properties upon reconstitution at 50% TS The milk spray dried powder according to the present invention was reconstituted to 50% TS which is generally the TS at which full fat milk is spray dried. It can be seen of FIG. 9 that the flow behavior is strongly shear thinning, exhibiting a steep negative slope and a high low shear viscosity. This is a sign that the product upon reconstitution had built some structure and that protein aggregates were able to interact between each other. Surprisingly, the structure could be recovered upon releasing the stress on the sample as the up and down curves were almost superimposed.

Example 4

Calcium Addition in Triple Concentrated Milk, Heat Treatment and Spray Drying

Material and Methods
Reference Milk

Commercially available, pasteurized, homogenized whole milk (3.5% fat content, Emmi, Lucerne, CH) was concentrated by a Scheffers 3 effects falling film evaporator (from Scheffers B.V.) to 50% total solids. The milk concentrate is cooled by a plate heat exchanger to 4° C. and pH of homogenized liquid milk concentrate was measured to be 6.5. The composition is preheated again to 60° C. by a plate heat exchanger and subsequently heated to 85° C. by direct steam injection system (self-construction of Nestlé) with a holding time of 15 seconds. After the heat treatment, the milk concentrate is rapidly cooled down by a 3VT460 CREPACO scrape heat exchanger (from APV Invensys Worb) to 40° C. The milk concentrate is then spray dried on a Nestlé 3.5 m Egron (self-construction) by a two-phase nozzle system (1.8 mm nozzle) to maximal moisture content of 3% and packed into air tight bags. Conditions of spray drying were: product flow of 413 kg/h at 37° C. product temperature, hot air inlet temperature of 270° C. and an air flow of 4664 kg/h, outlet air temperature of 88° C.

Sample of the Present Invention

Commercially available, pasteurized, homogenized whole milk (3.5% fat content, Emmi, Lucerne, CH) was concentrated by a Scheffers 3 effects falling film evaporator (from Scheffers B.V.) to 37% total solids. The milk concentrate is cooled by a plate heat exchanger to 4° C. and 6.5 mM calcium chloride is added. The calcium adjusted milk concentrate is preheated again to 60° C. by a plate heat exchanger and subsequently heated to 95° C. by direct steam injection system (self-construction of Nestlé) with a holding time of around 300 seconds. After the heat treatment, the milk concentrate is rapidly cooled down by a 3VT460 CREPACO scrape heat exchanger (from APV Invensys Worb) to 40° C. The milk concentrate is then spray dried on a NIRO SD6 3N spray dryer by a rotary disc nozzle system at 17,000 rpm to maximal moisture content of 3% and packed into air tight bags. Conditions of spray drying were: product flow of 20 L/h at 40° C. product temperature, hot air inlet temperature of 160° C. and an air flow of 360 m³/h, outlet air temperature of 80° C.

Size Distribution Measurements

The milk powders of the present invention were compared to the above references and were characterized by laser diffraction in order to determine particle size distribution (PSD=Particle Size Distribution) Powdered samples were reconstituted before measurements.

Distilled water was poured into a beaker and heated up to 42° C.-44° C. with a water bath. A volume of 150 mL distilled water at 42° C.-44° C. was measured and transferred into a glass beaker using a volumetric cylinder. An amount of 22.5 g milk powder is added to the 150 ml distilled water at 42° C. and mixed with a spoon for 30 s.

Dispersion of the liquid or reconstituted powder sample in distilled or deionised water and measurements of the particle size distribution by laser diffraction.

Measurement settings used are a refractive index of 1.46 for fat droplets and 1.33 for water at an absorption of 0.01. All samples were measured at an obscuration rate of 2.0-2.5%.

Flow Properties

Samples were reconstituted to 50% TS using the process described above. Flow experiments were performed using a controlled stress rheometer Physica MCR501 (Anton Paar®, Austria) with concentric cylinders geometry CC27-SS/S (diameter=27 mm, gap=1.14 mm by Anton Paar®, Austria). Steady state flow measurements were conducted in a constant temperature of 25° C., a shear stress of 100 1/s was applied to the samples during 5 min, following by four shear rates, one from 0-100 1/s and one other from 100-0 1/s, these were done twice; 15 measurements each 30 s were done. The apparent viscosity was recorded as a function of the shear rate.

For each measurement, an aliquot (19 mL) of the emulsion sample was poured into the cup. Measures were performed three times.

Results

Particle Size Distribution

Figure 10:
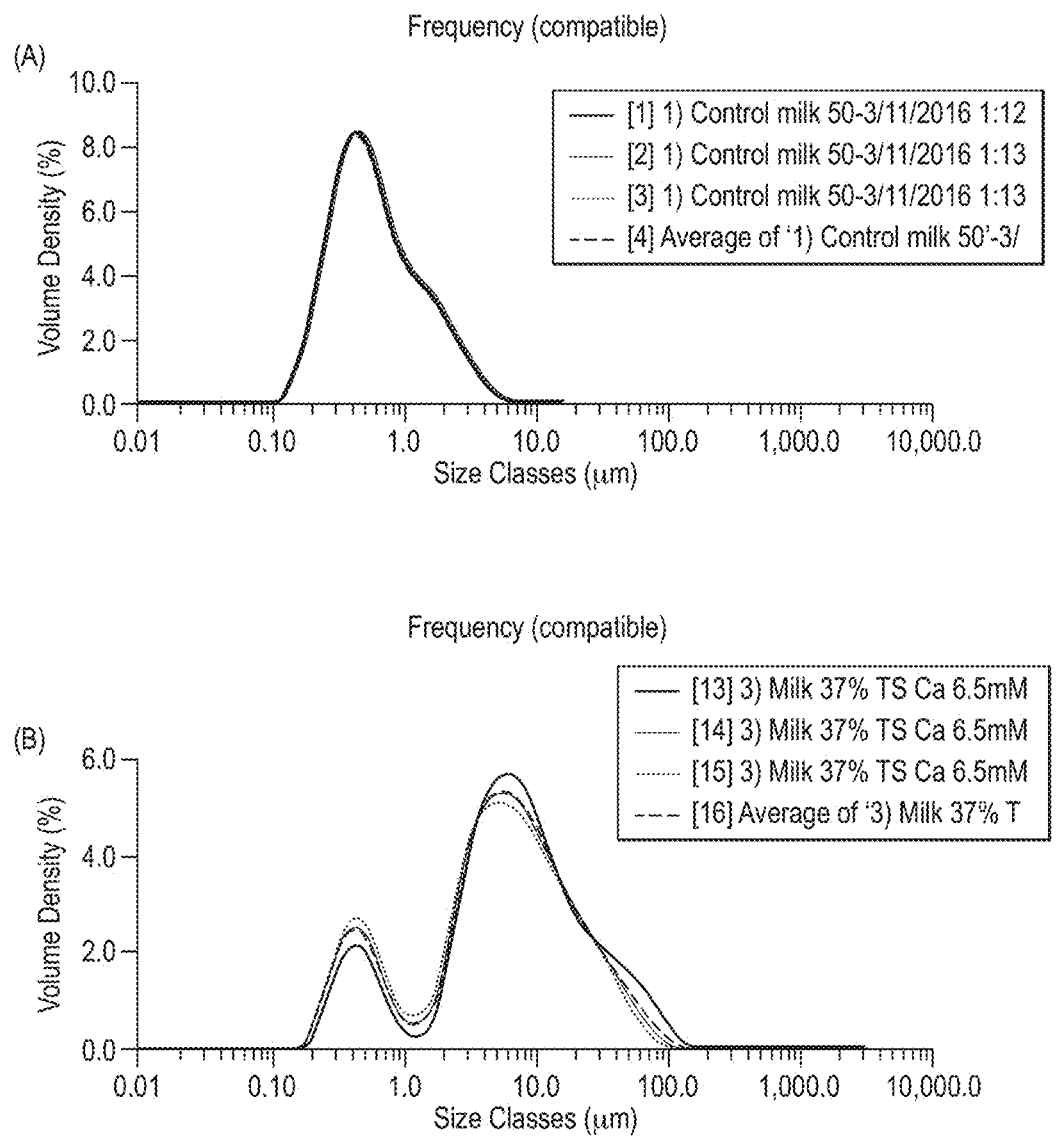
FIG. 10 shows the particle size distribution of control milk dried at 50% TS (A) and sample from the present invention (B) dried at 37% TS in presence of 6.5 mM CaCl2 after reconstitution at 13% TS.

The size distribution of full fat milk spray dried at 50% TS was determined after reconstitution to 13% TS (FIG. 10). It can be seen on FIG. 10A that a major peak was found 0.5 micron, followed by a tailing up to 6 microns. This indicates that the milk fat droplets and the micellar casein from milk are concomitantly measured that that no significant aggregation had occurred in the system. For the sample of the present invention that was treated in presence of 6.4 mM added calcium chloride, the size distribution was shifted to larger particle diameters. The D(4.3) reached 11 microns accounting for the presence of protein aggregates, while a small residual peak about 0.5 microns probably accounted for unreacted micellar caseins (FIG. 10B). The levels of soluble proteins were 33.5% in the control milk sample while it was 15.5% in the sample produced in the presence of added calcium. This shows again that the present invention favors the protein aggregation and the entrapment of oil droplets in the protein aggregates.

Flow Properties

Figure 11:
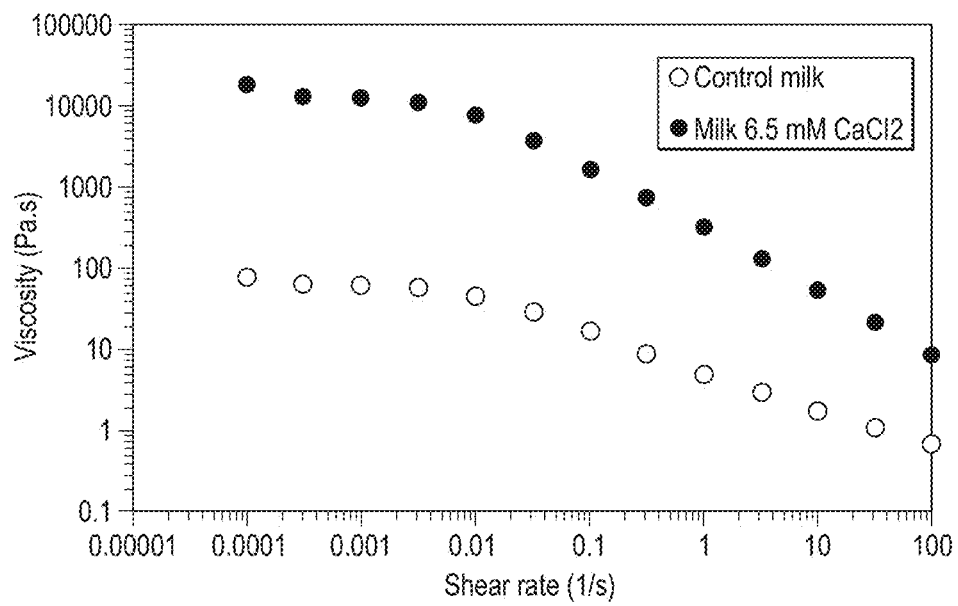
FIG. 11 shows a flow curve at 20° C. for control milk dried at 50% TS and sample from the present invention dried at 37% TS in presence of 6.5 mM CaCl2 after reconstitution at 50% TS.

The two milk powders were reconstituted to 50% TS and their flow properties were compared. Control full fat milk that was spray dried at 50% TS exhibited a shear thinning behavior and a low shear viscosity plateau about 100 Pa·s (see FIG. 11). The milk from the present invention, when reconstituted at 50% TS as well exhibited a shear thinning profile, but the low shear viscosity was 100 times larger and the shear thinning region had a much stronger slope. This is a sign of highly structured sample as well as the proof of interaction between the protein aggregates. It shows also that the present invention is clearly able to generate higher viscosity at equivalent fat content and has therefore potential for fat reduction in food products.

Milk Protein-Based Aggregates Obtained by Calcium Chloride Addition in Ice Cream Material and Methods Ice Cream Mix Preparation Two trials were performed and for both the preparation of the ice cream mix similar. A 200 lb mix was made in a Lanco mixer with the following ingredient concentrations:

TABLE 3

Composition of ice cream mix.

| Ingredient | Concentration (%) |
|---|---|
| Cream (40% Fat) | 13.397 |
| Condensed Skim Milk (30% SNF) | 32.354 |
| Water | 24.973 |
| Liquid Sucrose (67% solids) | 26.607 |
| Buttermilk Powder | 2.346 |
| Guar Gum | 0.147 |
| Pectin (60% Esterification) | 0.177 |

The final mix had a target of 36.7% Solids, 5.5% fat, 13% SNF.

The mix was then separated in to 40 lb samples and calcium chloride was mixed in and allowed to sit for 30 minutes before processing. The mix was pasteurized and homogenized using a microthermix unit. All mixes were preheated to 145F, then homogenized at 1500 first stage 500 second stage pressures. The final heating was at 182F with a 90 second hold time. The mix was then cooled to 45F and stored at 40F overnight. For the second trial all mixes were aerated and frozen using a KF-80 continuous freezer. The draw temperature for each mix was 21F and each ice cream was frozen to 105% overrun.

Ionic (Free Calcium) Determination

Ionic calcium concentration was measured using a Mettler-Toledo perfectION calcium sensitive electrode and a Mettler-Toledo Seven Multi pH/mV/ion meter in mV mode. Calcium ion concentration was calculated from the millivolt readings, based on a regression equation from a standard curve of mV readings for 10, 25, 100, 250, and 500 mg/L calcium standard solutions. These standards were prepared from a 1000 mg/L stock solution supplied by Mettler-Toledo.

Mix viscosity determination Mix Viscosity was measured using an Anton Paar rheometer MCR302. Each mix was measured at 40° F. (4.44° C.) using a Concentric cylinder measuring system CC27. The Ostwald-de Waele (power law) model was used for to calculate the estimated viscosity at 0 shear.

Ice Cream Melt Down Measurement

Using a Meltdown Analyzer MDA-1 (Certa Fides GmbH) at 22° C. Samples were placed onto pre-tared wire mesh trays (2.4 mm opening, equal to U.S. #8 mesh) and hung on weight sensors. The weight of ice cream remaining on the mesh trays is measured every 5 seconds throughout the test period. From this, the MDA software calculates the "% drip" based on immediate weight compared to the initial weight of the sample.

Particle Size Distribution

Particle size distribution was measured with a Malvern Mastersizer 3000 particle size analyzer. The temperature of the sample were 4.4° C. with the following instrument parameters: No ultrasonic, stirring speed 1700 rpm, Particle refractive index 1.4550, absorbance 0.100, dispersant refractive index 1.3300.

Sample Microstructure 1 part by weight ice cream mix was diluted in 9 parts of a buffered solution of Toluidine Blue 0 stain and mixed. The stain concentration is 0.04% by weight, dissolved in a mixture of 0.5% by weight Ricca/BDH pH 7 calibration buffer in deionized water, and passed through filter paper to remove any undissolved material. The pH 7 buffer contains NaH2PO4 and K2HPO4. After 60 seconds, 2 drops of the stained ice cream mixture are placed on a microscope slide, covering each with a 22 mm square cover glass. Using a 10x microscope objective with DIC optics, 40 images are captured while scanning across both cover glasses.

Results

Figure 12:
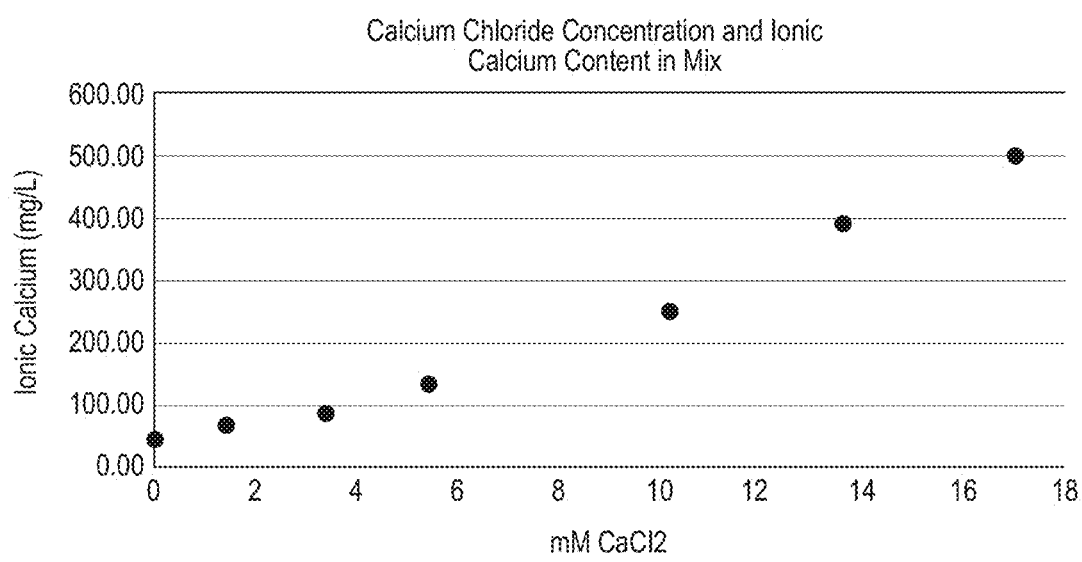
FIG. 12 shows the variation of ionic calcium in ice cream mix upon addition of CaCl2 at 20° C.
Figure 13:
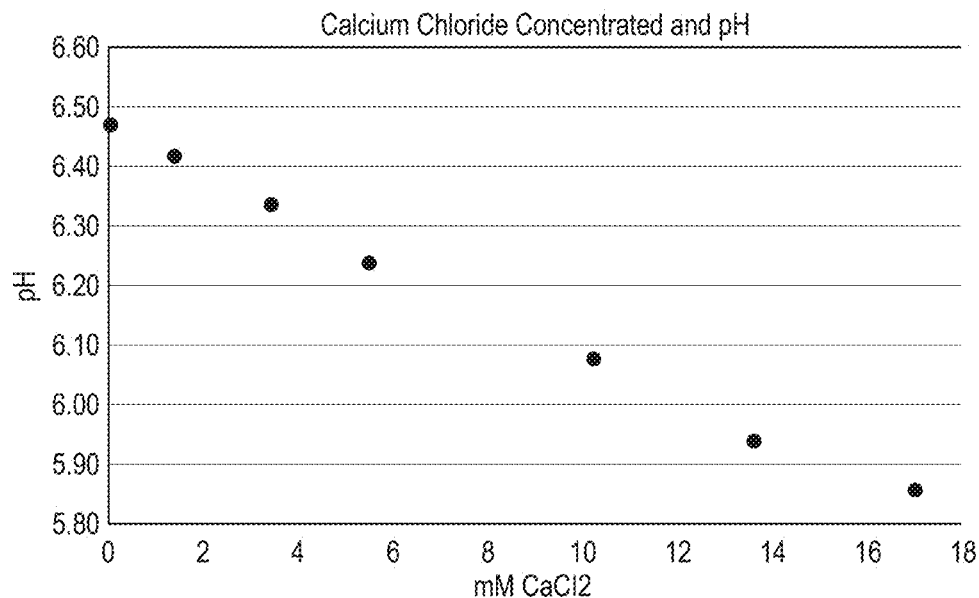
FIG. 13 shows the variation of pH in ice cream mix upon addition of CaCl2 at 20° C.

Ionic calcium measurement showed that the free calcium content in the ice cream was increasing with the addition of calcium chloride in the mix (FIG. 12). Surprisingly, a slope change was visible at a critical concentration of added CaCl2 of 8 mM which could correspond to the surface saturation of proteins by calcium ions in this ice cream recipe.

As was already reported in example 1, the addition of calcium chloride was leading to a linear decrease of the pH, indicating that calcium ions were displacing proteins from the surface of proteins and were therefore reducing their charge density (see FIG. 12).

Ice Cream Viscosity

Figure 14:
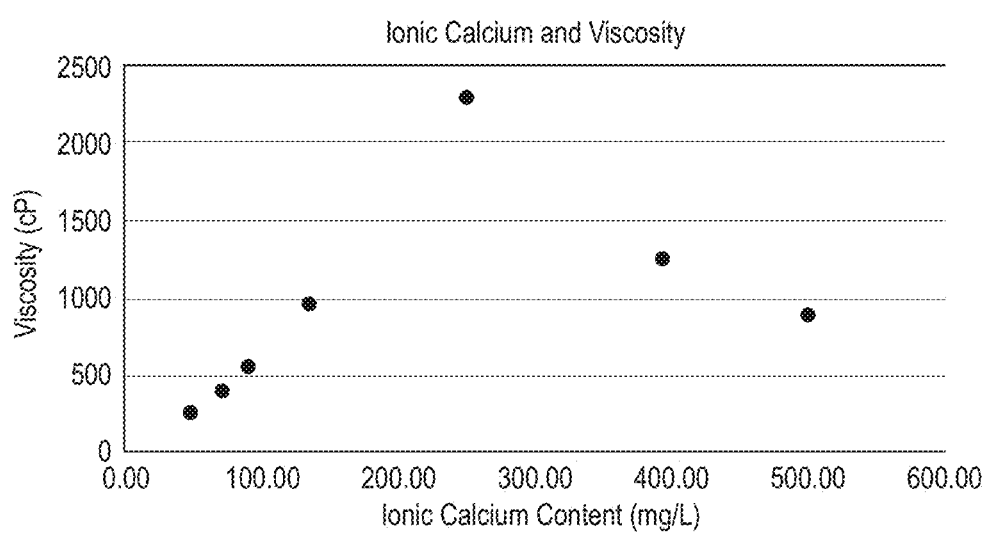
FIG. 14 shows the variation of viscosity in ice cream mix as a function of ionic calcium content at 20° C.

Upon pasteurization, the viscosity of the ice cream mix increased with increasing free calcium up to 0.25 g/L (6.25 mM calcium) as shown in FIG. 14. This viscosity increase was likely due to the formation of protein aggregates in the mix so that particle interactions did occur. Upon further increase of the calcium in the mix, a decrease of viscosity was noticed which could be partially due to dissociation of micellar caseins but also overcharging of protein surface so that particle aggregation was hindered.

Particle Size and Morphology

Figure 15:
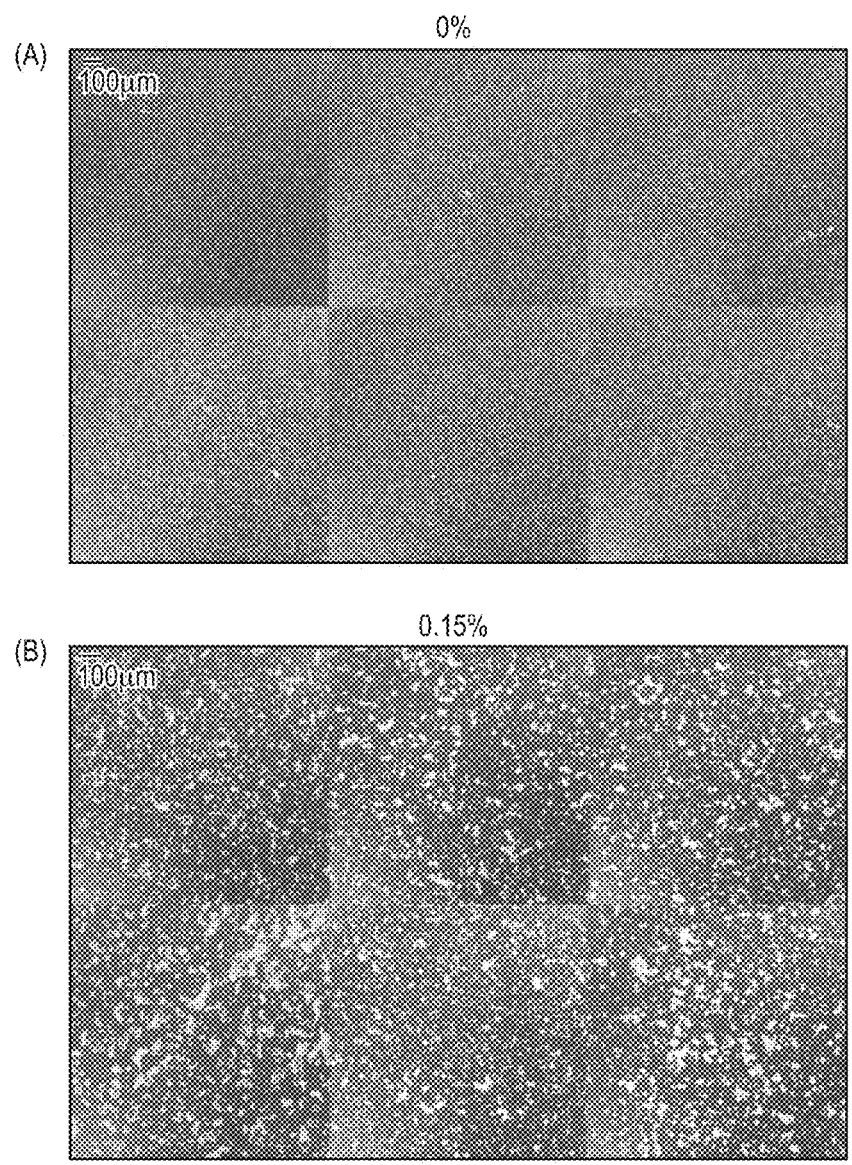
FIG. 15 shows microscopic appearance of ice cream mixes with and without addition calcium chloride after pasteurization and cooling. (A) No free calcium in sample. (B) 0.15% (0.15 g/L) free calcium in sample. Scale bar is 100 microns.

The formation of particle aggregates was shown by size measurements after dilution of the ice cream mix (see Table 4). It can be observed that the $D_{(4,3)}$ increased up to addition of 10 mM CaCl2 and then decreased when further calcium ions were added. The morphology of the aggregates can be observed on FIG. 15 which shows micrographs of ice cream mix where protein-based aggregates were dyed by use of toluidine blue. Very small aggregates were observed in the control ice cream mix (FIG. 15A) while much larger particles were formed when 0.15% added CaCl2 was present, corresponding to 10 mM free calcium (FIG. 15B).

TABLE 4

Average Particle Size ($D_{(4,3)}$) in the ice cream mix as a function of calcium chloride addition.

| CaCl$_2$ (mM) | 0 | 1.36 | 3.4 | 5.44 | 10.2 | 13.61 | 17.00 |
|---|---|---|---|---|---|---|---|
| $D_{(4,3)}$ in microns | 1.25 | 1.25 | 3.06 | 4.58 | 16.21 | 11.28 | 9.24 |

Ice Cream Melting and Informal Tasting

Figure 16:
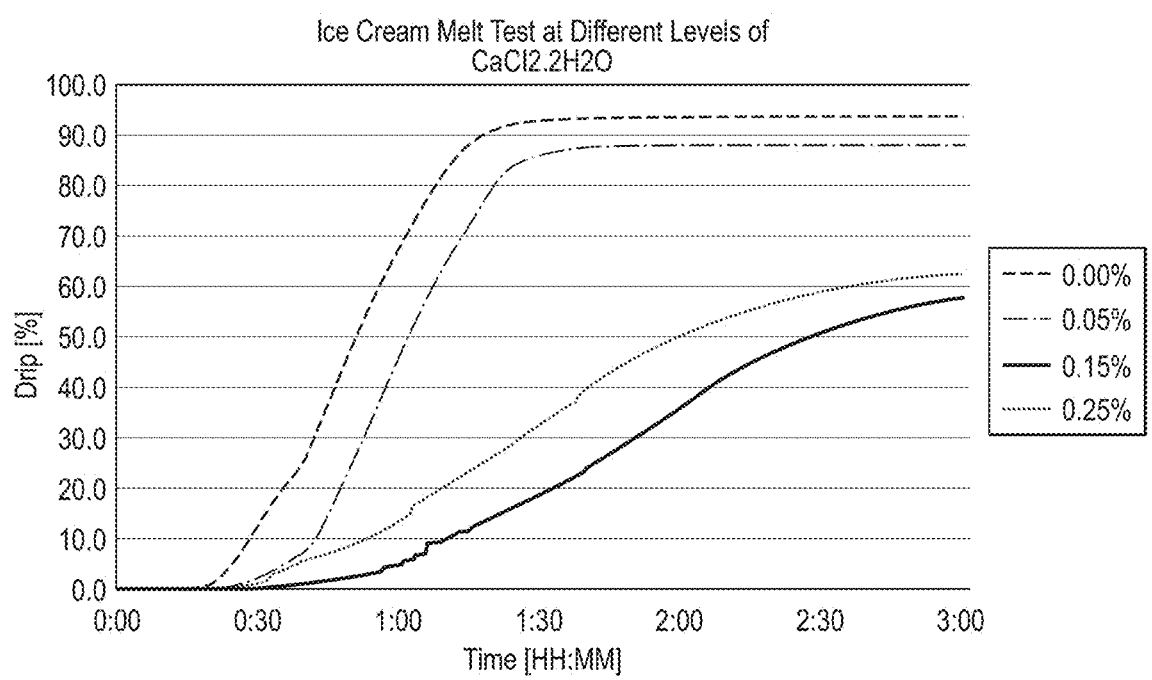
FIG. 16 shows the melting profiles of ice cream produced with different levels of calcium chloride at 22° C.

The melting profiles of the ice cream containing various level of added calcium chloride are presented on FIG. 16. It can be seen that low level of calcium addition was leading to similar melting profile than control sample while higher calcium content was leading to slower melting. The level of protein aggregation induced by calcium had therefore an important effect on the finished ice cream and should be adjusted depending on needs.

The samples were tasted by a panel and it was found that low level of calcium chloride addition were leading to pleasant samples while higher levels were leading the noticeable texture and taste issues (see Table 5).

TABLE 5

Sensory Results.

| mM CaCl$_2$ in Mix | Texture (compared to 0%) | Flavor (compared to 0%) |
|---|---|---|
| 3.4 | Very similar, slightly less cold | No Difference |
| 10.2 | Smoother, Chewier, Slower Melt | Slight Off taste, not objectionable |
| 17.00 | Slightly Smoother, Slightly Less Cold, Slightly slower melting | Very Strong Off taste, Chalky, Sanitizer |

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A food or beverage product comprising:
   agglomerated proteins comprising aggregates of micellar caseins and whey proteins, a ratio of the micellar caseins to the whey proteins is in a range of 90/10-60/40;
   6-40 wt. % milk solids; and
   3-8 mM free divalent cations;
   the food or beverage product has a pH of 6.1-7.1, and the agglomerated proteins have a mean diameter $D_{(4,3)}$ of 10-40 microns as measured by laser diffraction;
   wherein the agglomerated proteins comprise the micellar caseins and beta-lactoglobulin from the whey proteins.

2. The food or beverage product of claim 1, wherein the free divalent cations are selected from the group consisting of $Ca^{2+}$, $Mg^{2+}$ and combinations thereof.

3. The food or beverage product of claim 1, wherein the free divalent cations are $Ca^{2+}$.

4. The food or beverage product of claim 1 comprising 3.5-6.5 mM of the free divalent cations.

5. The food or beverage product of claim 1 comprising 0-36 wt. % fat.

6. The food or beverage product of claim 1, wherein the product is a food product comprising an oil-in-water emulsion.

7. A food or beverage product comprising:
agglomerated proteins comprising aggregates of micellar caseins and whey proteins, a ratio of the micellar caseins to the whey proteins is in a range of 90/10-60/40;
6-40 wt. % milk solids; and
3-8 mM free divalent cations;
the food or beverage product has a pH of 6.1-7.1, and the agglomerated proteins have a mean diameter $D_{(4,3)}$ of 10-40 microns as measured by laser diffraction;
wherein the food or beverage product comprises a soluble protein in an amount below or equal to 30 wt. % of a total protein content.

8. A food or beverage product comprising:
agglomerated proteins comprising aggregates of micellar caseins and whey proteins, a ratio of the micellar caseins to the whey proteins is in a range of 90/10-60/40;
6-40 wt. % milk solids; and
3-8 mM free divalent cations;
the food or beverage product has a pH of 6.1-7.1, and the agglomerated proteins have a mean diameter $D_{(4,3)}$ of 10-40 microns as measured by laser diffraction;
wherein the product further comprises 2.5-10 wt. % fat.

9. A food or beverage product comprising:
agglomerated proteins comprising aggregates of micellar caseins and whey proteins, a ratio of the micellar caseins to the whey proteins is in a range of 90/10-60/40;
6-40 wt. % milk solids; and
3-8 mM free divalent cations;
the food or beverage product has a pH of 6.1-7.1, and the agglomerated proteins have a mean diameter $D_{(4,3)}$ of 10-40 microns as measured by laser diffraction;
wherein the product further comprises a total protein content of 1-15 wt. %.

10. A food or beverage product comprising:
agglomerated proteins comprising aggregates of micellar caseins and whey proteins, a ratio of the micellar caseins to the whey proteins is in a range of 90/10-60/40;
6-40 wt. % milk solids; and
3-8 mM free divalent cations;
the food or beverage product has a pH of 6.1-7.1, and the agglomerated proteins have a mean diameter $D_{(4,3)}$ of 10-40 microns as measured by laser diffraction;
wherein the food or beverage product is a mix for a frozen confection.

11. The food or beverage product of claim 10, wherein the mix is frozen.

12. A food or beverage product comprising:
agglomerated proteins comprising aggregates of micellar caseins and whey proteins, a ratio of the micellar caseins to the whey proteins is in a range of 90/10-60/40;
6-40 wt. % milk solids; and
3-8 mM free divalent cations;
the food or beverage product has a pH of 6.1-7.1, and the agglomerated proteins have a mean diameter $D_{(4,3)}$ of 10-40 microns as measured by laser diffraction;
wherein the product further comprises fat in an amount of 0.5-20 wt. %, non-fat milk solids in an amount of 6-15 wt. %, a sweetening agent in an amount of 5-30 wt. %, a stabilizer system in an amount up to 6 wt. %.

* * * * *